United States Patent Office 2,707,177
Patented Apr. 26, 1955

2,707,177

ETHOXYLINE-TRIALLYL CYANURATE RESINOUS COMPOSITIONS

Russell A. Skiff, Waterford, and Robert W. Finholt, Lawrence Park, Pa., assignors to General Electric Company, a corporation of New York No Drawing. Application November 29, 1952, Serial No. 323,341

20 Claims. (Cl. 260—30.6)

This invention is concerned with novel resinous compositions of matter. More particularly the invention relates to compositions of matter comprising (1) a complex epoxide resin comprising a polyether derivative of a polyhydric organic compound, e. g., a polyhydric alcohol or phenol containing epoxy groups, which for brevity will hereinafter be referred to as an "ethoxyline resin" and (2) triallyl cyanurate. The invention also includes heat-treated products prepared from the aforementioned mixture of ingredients.

It has been disclosed in U. S. Patent 2,324,483—Castan that epoxy resins comprising the products of reaction of a phenol having at least two phenolic hydroxy groups and an epihalogenohydrin, e. g., epichlorohydrin, in which the said product contains at least two ethylene oxide groups, may be converted to the substantially thermoset stage by employing a polybasic carboxylic acid or anhydride, for instance, phthalic anhydride, as a cure accelerator. The resinous reaction products with which the polybasic carboxylic acid is employed are generally complex resins comprising a polyether derivative of a polyhydric phenyl containing epoxy groups and are commonly know as "ethoxyline resins" and are sold under the trade names of e. g., Epon or Araldite resins. Although the use of these polybasic carboxylic acids or anhydrides gives useful products, nevertheless, there are certain disadvantages inherent in using such materials. In the first place, the shelf life of the mixture (either unreacted or partially reacted) of the ethoxyline resin and the polybasic carboxylic acid or anhydride is unsatisfactory and after relatively short periods of time, it is found that the mixture tends to advance in its state of cure so that ultimately if not employed within a reasonable time after addition of the acid or anhydride, the mixture becomes useless for most applications. As a further disadvantage of the use of these anhydrides as cure accelerators, it is found that when incorporated in the ethoxyline resin, and the mixture is used in the form of thin films, there is a great tendency to lose the cure accelerator by vaporization when the films are heated at elevated temperatures of the order of from 150° to 200° C. which are the temperatures generally required to effect curing of the film. This loss of the cure accelerator results in a variable composition and impaired physical properties in the cured resin. A further disadvantage in the use of the presently known cure accelerators for ethoxyline resins is the fact that the cured products have undesirably low softening points and are not as hard as is advantageously desired in certain applications in which hardness is an important requisite.

Even the curing of ethoxyline resins using alkaline curing agents as, for instance, alkylamines of the type described in U. S. Patents 2,500,600, 2,506,486, 2,510,885 and 2,528,359 do not obviate the defects residing in the use of the polycarboxylic acids or anhydrides as cure accelerators. The same disadvantages are inherent in using the alkylamines as curing agents.

We have now discovered that mixtures comprising the aforementioned ethoxyline resins may be prepared which are eminently useful in many applications and which have properties which are superior to the properties of mixtures of ethoxyline resins heretofore prepared and used for the same purpose. More particularly, we have found that the combination of an ethoxyline resin together with triallylcyanurate has properties which obviate many of the difficulties heretofore encountered using polybasic carboxylic acids or anhydrides, or alkaline materials as cure accelerators for ethoxyline resins. The mixture of the ethoxyline resins and the triallyl cyanurate, even in the partially reacted state, can be stored at room temperature for long periods of time, for instance, for about two or three months, and at the end of this time the mixture will be found to be still soluble and fusible whereas resins prepared from the ethoxyline resin using organic acid anhydrides alone as the cure accelerator were substantially insoluble and infusible in less than 31 days at room temperature; actually the latter combination of ingredients is unusable in less than about two weeks. Moreover, the resinous compositions prepared in accordance with our invention are much harder and have softening points which are significantly higher than the softening point of ethoxyline resins cured, for instance, by the use of other cure accelerators, such as the aforesaid alkaline materials, particularly the alkylamines.

The ethoxyline resins defined above as being a complex epoxide resin comprising a polyether derivative of a polyhydric organic compound containing epoxy groups are disclosed in various places in the art. Among such references may be mentioned the aforesaid Castan Patent 2,324,483, as well as Castan Patent 2,444,333, British Patents 518,057 and 579,698, and U. S. Patent 2,569,920. For the most part, these ethoxyline resins are based on the resinous product of reaction between an epihalogenohydrin, for instance, epichlorohydrin, and a phenol having at least two phenolic hydroxy groups, for example, bis-(4 - hydroxyphenyl)-2,2-propane. U. S. Patents 2,494,295, 2,500,600 and 2,511,913 also describe examples of ethoxyline resinous compositions which may be employed in the practice of the present invention. By reference, all the aforementioned patents are intended to be part of the present description of the ethoxyline resins used and for brevity, the ethoxyline resins will not be described other than that they contain more than one ethylene oxide group, e. g., from 1 to 2 or more epoxide groups, per molecule, and may be prepared by effecting reaction between a polyhydric phenol or alcohol, for example, hydroquinone, resorcinol, glycerine, and condensation products of phenols with ketones, for instance, bis-(4-hydroxyphenyl)-2,2-propane, with epichlorohydrin. For example, the reaction of epichlorohydrin with bis-(4-hydroxyphenyl)-2,2-propane may be formulated as follows:

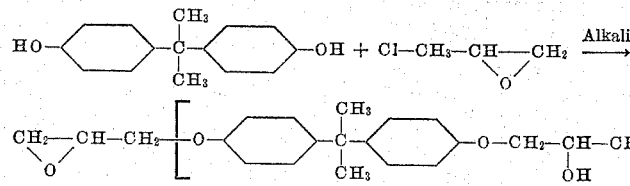

where $n$ has an average value varying from around zero to about 7. Many of these ethoxyline resins are sold under the name of Epon resins by Shell Chemical Corporation, or Araldite resins by the Ciba Company. Data on the Epon resins are given in the table below:

TABLE I

| Epon No. | Epoxide Equivalent | Approximate Esterification Equivalent | M. P., °C. |
|---|---|---|---|
| RN-34 | 225-290 | 105 | 20-28. |
| RN-48 | 192 | 80 | 9. |
| 1064 | 300-375 | 105 | 40-45. |
| 1062 | 140-165 | | Liquid. |
| 1004 | 905-985 | 175 | 97-103. |
| 1007 | 1,600-1,900 | 190 | 127-133. |
| 1009 | 2,400-4,000 | 200 | 145-155. |
| 1001 | 450-525 | 130 | 64-76. |

The complex epoxides used with the triallyl cyanurate contain epoxide groups or epoxide and hydroxyl groups as their functional groups and are generally free from other functional groups such as basic and acidic groups.

The triallyl cyanurate which is employed in combination with ethoxyline resin has the formula

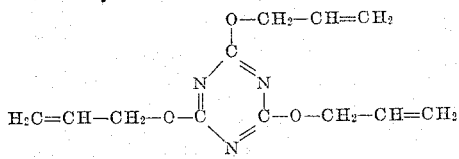

and is a liquid which is sold by the American Cyanamid Company, Stamford, Connecticut. The mixture of the triallyl cyanurate and ethoxyline resin gives products of much lower viscosity than the viscosity of the ethoxyline resins themselves, thus permitting the use of such mixtures in more applications. The viscosity of the mixture becomes lower as the ratio of triallyl cyanurate is increased.

The proportions of ethoxyline resin and triallyl cyanurate which may be employed may be varied within wide limits. Thus, based on the total weight of the ethoxyline resin and the triallyl cyanurate, the latter may comprise, for instance, from about 1.0 to 95 per cent of the total weight of the ingredients. Generally, amounts of triallyl cyanurate, ranging for instance, from about 2 to 50 per cent, are advantageously employed with the ethoxyline resins, although the effects of even small amounts of triallyl cyanurate are evident in the finally heat-treated product. As the proportion of triallyl cyanurate increases, for instance, from about 10 to 75 per cent, the hardness and softening point properties of the heat-converted mixture are greatly improved over the hardness and softening point of ethoxyline resins cured by means of, for instance, acidic or alkaline materials above.

In order that those skilled in the art may better understand how the present invention may be practiced, the following examples are given by way of illustration and not by way of limitation. All parts are by weight.

*Example 1*

Triallyl cyanurate was mixed in varying proportions with an ethoxyline resin specifically Epon RN-48 (described previously) and thereafter the mixtures heated for about 120 hours at about 150° C., even though for most applications it has been found that heating for 16 to 20 hours at this temperature is sufficient. The following Table II shows the proportions of ethoxyline resin and triallyl cyanurate employed in the preparation of the various samples described in the present example.

TABLE II

| Sample No. | Parts Epon RN-48 | Parts Triallyl Cyanurate |
|---|---|---|
| 1 | 17.02 | 3.12 |
| 2 | 17.02 | 6.23 |
| 3 | 17.02 | 12.46 |
| 4 | 8.51 | 9.45 |
| 5 | 8.51 | 12.46 |

The above heat-treated samples were tough and exceptionally hard, and had high softening points. This fact was clearly brought out when each of the above cured mixtures was tested for heat distortion employing ASTM D648-45T as the procedure for determining the heat distortion point. The following Table III gives the results of these heat distortion tests on the various heat-treated samples described in Table II.

TABLE III

| Sample No. | Temperature at which Distortion Began, °C. | 0.025" Distortion, °C. |
|---|---|---|
| 1 | 70 | 96 |
| 2 | 100 | 131 |
| 3 | 100 | 145 |
| 4 | 100 | 150 |
| 5 | 100 | 130 |

The advantageous heat distortion properties of the cured mixtures described above are more clearly understood from the results shown in following Table IV in which are shown heat distortion points of ethoxyline resins cured to essentially the same state of cure employing acidic or alkaline curing agents. More particularly, three different ethoxyline resins were mixed with either an alkaline or acidic curing agent and the mixtures heated and the heat-converted products were tested for heat distortion points employing the same test method described above. Epon RN-48 has been described previously. The Araldite ethoxyline resin described below is known in the art as Araldite CN-501 (formerly Araldite casting resin B) and has properties which are approximately intermediate between Epon resin 1064 and 1001. Houghton resin 6020 is a modified ethoxyline resin similar to the Araldite resin described above and eminently suitable as a casting resin. The amount of curing agent used is expressed in weight per cent, based on the weight of the ethoxyline resin. The following Table IV shows the results of the heat distortion tests conducted on the three mixtures of resinous compositions employing the alkaline and acidic curing agents.

TABLE IV

| Ethoxyline Resin | Curing Agent | Percent Curing Agent | Temperature at which Distortion Began, °C. | 0.025" Distortion, °C. |
|---|---|---|---|---|
| Epon RN-48 | Benzyldimethylamine. | 10 | 80 | 128 |
| Houghton Resin #6020. | Reported to be an aliphatic amine. | 25 | 70 | 118 |
| Araldite Resin CN-501 [1]. | Phthalic Anhydride. | 30 | 90 | 134 |

[1] This material is fairly brittle.

It should be noted that the heat-treated mixture of sample No. 3 described in Table II was found to have a Rockwell Hardness of E-83 as compared to the usual hardnesses for cured ethoxyline resins of about M-100 which is the listed normal hardness for ethoxyline resins in the book "Modern Plastics Encyclopedia and Engineers Handbook," 1952 edition, published by Plastics Catalog Corporation, 557 Madison Avenue, New York 22, New York. So far as is known, such a hardness for a synthetic resinous composition without a filler is unusual and the only known harder synthetic plastic materials are the mineral-filled phenolic resins. In contrast to the above-described properties of the mixture of the triallyl cyanurate and the ethoxyline resin, polymerized triallyl cyanurate is rather brittle.

Although the mixture of the ethoxyline resin and the triallyl cyanurate is self-curing in the presence of heat, it will be apparent to those skilled in the art that the presence of curing agents for both the ethoxyline resin and the triallyl cyanurate is not precluded. Thus, in connection with curing such a mixture, particularly the ethoxyline resin, acceleration in cure may be obtained by employing either alkaline or acidic curing agents generally known in the art. Among these may be mentioned, for example, phthalic anhydride, oxalic acid, citric acid, diethylenediamine, diethylenetriamine, sodium hydroxide, sodium phenoxide, dimethyl benzyl amine, triethylamine, nitrogenous resins (e. g., urea-formaldehyde resins, melamine-formaldehyde resin, etc.), dicyandiamide, benzyl guanidine, etc. A particular class of amines which has been found exceptionally successful as curing agents for combination with the mixture of the triallyl cyanurate and the ethoxyline resin are the long-chain normal alkyl amines, namely, those containing from about 8 to 18 carbon atoms, as, for instance, octyl amine, decyl amine, lauryl amine, stearyl amine, etc. One of the unique advantages of using such long-chain normal amines as catalysts, even for the ethoxyline resin above, is that an indefinite pot life can be realized at room temperature, and with the application of heat, conversion of the resinous mixture takes place readily to the desired state of cure. In addition, cured resins using the long-chain resins exhibit improved flexibility over similar resins cured with shorter chain amines. Such properties obtainable by using the long-chain amines as curing agents represent an advantage as far as commercial use of the resinous mixture is concerned, since the presence of such catalysts permits handling large volumes of catalyzed resins at room temperature without undesirable polymerization. This is in contrast to the experience in using other suggested amine derivatives for accelerating the cure of ethoxyline resins such as, for instance, piperidine, diethylene triamine, pyridine, diethylamine, etc., all of which impart a very short pot life to the catalyzed resin and require that the resinous mixture be employed without undue delay in order to prevent losses due to premature conversion of the resinous compositions to the cured state. The amount of curing agent employed with the ethoxyline resin may be varied widely and may range, for instance, from about 2 to 10% or more, by weight, based on the weight of the ethoxyline resin.

Because of the rate of cure of the triallyl cyanurate in its reaction with the ethoxyline resin, specific curing agents for the former are not necessary although there may be added to the mixture of ingredients vinyl polymerization accelerators well known in the art for the purpose. Among these may be mentioned, for example, symmetrical diacyl perovides, e. g., acetyl peroxide, lauroyl peroxide, benzoyl peroxide, etc.; tertiary butyl perbenzoate, tertiary butyl hydroperoxide, cyclohexyl hydroperoxide, terpene peroxide, such as ascaridole, etc.; peroxides of the drying oils such as those formed on oxidation of linseed oils, etc.; dialkyl peroxides, for example, di-(tertiary butyl) peroxide, lauryl peroxide, stearyl peroxide, etc. The percentage of the vinyl polymerization catalyst if it is used, is preferably within the range of from about 0.02 to 2.5 per cent of the weight of the triallyl cyanurate.

One of the applications for which the compositions of matter herein described are eminently suitable is in adhesive applications. The following example illustrates the use of such a mixture for adhering the ends of steel rods.

Example 2

A mixture was prepared comprising 100 parts Epon RN-48 resin, 2 parts triallyl cyanurate, and 10 parts of normal dodecylamine. This mixture was used to coat the ends of two steel rods ⅝" in diameter and the coated portions of the rods were positioned next to each other end-to-end, and the assembly permitted to remain this way for about five days at 150° C. At the end of this time, the breaking value for the joint was tested and found to be about 5950 pounds per square inch. The use of the Epon resin alone employing phthalic anhydride as a cure accelerator for joining aluminum-to-aluminum surfaces, when tested in the same fashion, gave a value of about 2580 p. s. i. Normally, the degree of adhesion of aluminum-to-aluminum surfaces using resinous adhesives is greater than the adhesion of steel-to-steel surfaces using the same resinous adhesives, and it was surprising and unexpected to find that the adhered steel-to-steel surfaces had greater strength.

It has also been found that the mixture of the ethoxyline resin and the triallyl cyanurate can be combined advantageously with plastisols, and that such mixtures have highly desirable properties and wide use. In the first place, such a mixture is of unexpectedly low viscosity and has thixotropic properties when used, for instance, as a hot-dip compound. Moreover, the mixture of these three ingredients is unexpectedly capable of imparting good bonds between metal surfaces when used as an adhesive and is fire-resistant and self-extinguishing. In addition, it has also been found that even when used as a hot-dip compound, coatings using this material are quite uniform and give excellent "build" around sharp corners. Mixtures of the ethoxyline resin, triallyl cyanurate, and the plastisol when heated to the finally cured stage are flexible, very tough and heat-resistant compositions having unusually high dielectric strengths which makes such materials eminently suitable for high voltage electrical equipment.

It has been found that a cured mixture of ingredients comprising, by weight, 25 parts Epon RN-48, 25 parts triallyl cyanurate, and 50 parts of a plastisol, specifically a finely divided copolymer of vinyl chloride and vinylidene chloride suspended in a plasticizer therefor comprising a dialkyl phthalate, when heated at 125° C., 150° C. and 175° C. for nine weeks was still unimpaired as far as its properties were concerned. This compares with the maximum temperature resistance of ordinary plastisols which generally fail after 8 to 10 days at 175° C. When a copper bar having sharp corners was dipped in the aforementioned mixture of ethoxyline resin, triallyl cyanurate, and plastisol, and the coated bar heat-treated to cure the resinous ingredients, and thereafter the bar tested for dielectric breakdown, the following results were obtained:

TABLE V

| Number of Dips of Copper Bar | Build | | Dielectric Breakdown, volts |
|---|---|---|---|
| | Side, mils | Corner, mils | |
| 1 | 17 | 8.5 | 18,000 |
| 2 | 24.5 | 15 | 20,000 |
| 2 | 19 | 8 | 13,000 |

The adhesion of the coating to the copper was outstandingly good.

One of the surprising features of using the above-mentioned mixture of ingredients for hot-dipping operations is the fact that even after repeated hot-dipping, that is, even after heated metallic articles were dipped repeatedly for about two months in the resinous mixture, the latter was still in usable condition for dipping, and showed little evidence of increase in viscosity or other undesirable change. In contrast to this, in relatively short periods of time, repeated hot-dipping in the plastisol itself, causes the latter to become partially cured and therefore difficult to work with.

It will, of course, be apparent to those skilled in the art that instead of using the ethoxyline resins described above, other ethoxyline resins may be employed, many examples of which have been given above, without departing from the scope of the invention. In addition, if desired, other curing agents for the ethoxyline resins or polymerization catalysts for the triallyl cyanurate may be employed with satisfactory results.

The procedures for preparing the compositions and using the same described in the foregoing examples can obviously be modified using procedures well known in the art. Generally, it is only necessary to effect homogeneous intermixing between the ingredients and thereafter heating the latter for times varying from about three to sixty hours or more at temperatures ranging from about 125° to 200° C. Obviously, the heating time and temperatures required to convert the resinous mixture to the desired state of cure will depend upon such factors as the ingredients employed, the ratio of ingredients, type of curing agents for the ethoxyline resin or triallyl cyanurate, the temperature of heating, etc. Each application in which the compositions of matter herein described are employed will dictate the necessary conditions for effecting the desired state of cure.

With regard to the plastisols herein described for employment with the mixture of triallyl cyanurate and ethoxyline resin, it will be apparent that other types of plastisols well known in the art may be employed without departing from the scope of the invention. Thus, these plastisols which generally comprise finely divided dispersions of vinyl halide resins (preferably having an average particle size of from about 10 to 100 microns in average diameter) in plasticizers for the vinyl halide resin may include as the dispersed phase, finely divided polychlorotrifluoroethylene, polyvinyl chloride, polyvinylidene chloride, etc., finely divided copolymers of vinyl chloride and vinylidene chloride, copolymers of vinyl halides and vinyl esters wherein the vinyl ester comprises a minor proportion of the total weight of the latters and the vinyl chloride prior to copolymerization, for instance, copolymers of vinyl chloride and vinyl acetate, copolymers of vinyl chloride and vinyl propionate, etc. The dispersing phase, that is, the plasticizer for the vinyl halide resin, may comprise (in addition to other modifying agents such as stabilizers for the vinyl halide resins, surface active agents, etc.), for instance, dibutyl phthalate, tricresyl phosphate, dioctyl phthalate, dibutyl sebacate, dinonyl phthalate, di-2-ethylhexyl phthalate, glyceryl monostearate, etc. The plasticizer may comprise from about 40 to 100 per cent, by weight, of the total weight of the latter and the vinyl halide resin.

In addition to plastisols comprising a vinyl halide resin and a plasticizer therefor, the plastisols may also contain polymerizable ingredients as, for instance, unsaturated alkyd resins (e. g., diethylene glycol maleate, dipropylene glycol fumarate, etc.) as well as other copolymerizable liquid polymerizable compositions containing a terminal polymerizable olefinic linkage (e. g., styrene, acrylonitrile, diallyl phthalate, methyl methacrylate, etc.). Such types of plastisols are more particularly disclosed and claimed in Loritsch et al., Patent 2,567,719, filed September 11, 1951 and assigned to the same assignee as the present invention. This patent, which also includes additional examples of plasticizers for the vinyl halide resins as well as various other examples of unsaturated alkyd resins, vinyl halide resins and copolymerizable ingredients, by reference, is made part of the disclosures of the present application. The amount of plastisol (either with or without copolymerizable ingredients) may be varied widely. Based on the total weight of the plastisol, triallyl cyanurate, and ethoxyline resin, the plasisol advantageously comprises about 2 to 90 per cent, by weight. Obviously, larger or smaller amounts of plastisol may be employed depending on such factors as type of ethoxyline resin used, proportions of triallyl cyanurate and ethoxyline resin in mixture, application for which mixture is intended, etc. A ratio of ingredients which may advantageously be used comprises the following where all parts are by weight.

| | Parts |
|---|---|
| Triallyl cyanurate | 2 to 75 |
| Ethoxyline resin | 2 to 75 |
| Plastisol | 0 to 75 |

A composition which has been found to be particularly advantageous is one comprising, by weight, 25 parts triallyl cyanurate, 25 parts of an ethoxyline resin, and from 40 to 70 parts of a plastisol.

The mixture of the triallyl cyanurate and ethoxyline resin either alone or combined with curing agents for the triallyl cyanurate and the ethoxyline resin may also be interacted simultaneously with other copolymerizable ingredients, for instance, styrene, acrylonitrile, methyl methacrylate, ethyl acrylate, etc. In such instances, it may be desirable to incorporate a vinyl polymerization catalyst, examples of which have been given above, in order to effect more rapid curing of the polymerizable ingredients containing the terminal olefinic polymerizable groupings and including the triallyl cyanurate.

The presently claimed compositions of matter may also be intermixed with other types of polyesters, for instance, acidic polyesters of the type described in Cass applications, Serial Nos. 254,207 and 254,208, filed October 31, 1951, now Patent Nos. 2,683,131 and 2,691,007, respectively, and assigned to the same assignee as the present invention.

The compositions of matter herein described have utility in many applications in addition to the ones described above. Thus, various useful solutions of the unreacted mixture of the trialiyl cyanurate and the ethoxyline resins or precondensed resins derived therefrom (either by themselves or in combination with other ingredients, such as the aforementioned plastisols and curing agents) may be prepared by using different volatile solvents. Such solvent materials are, for example, acetone, cyclohexanone, methyl ethyl ketone, ethylene dichloride, etc., to which aromatic diluents such as benzene, toluene, etc., can be added. When solutions of the mixture of ingredients or precondensed resins are prepared, the solutions may be used for surface coatings (including as wire conductor insulation, liners for various receptacles, etc.) as adhesives, as impregnating agent for various sheet materials including sheets of cloth, paper, asbestos, mica, etc. Laminated products may be prepared by treating the sheet material with a solution of the mixture of the ethoxyline resin and the triallyl cyanurate or precondensed resins thereof, and evaporating substantially all the solvent and thereafter superposing the sheets upon each other and molding the assembly under heat and pressure for a time sufficient to cure the laminated product. In such instances, temperatures of the order of about 150° to 200° C. for times ranging from about ¼ to 6 or more hours are advantageously used. Advantage may be taken of the hardness of the cured compositions herein described as overcoats over softer resinous surfaces to improve the mar-resistance of the latter.

Various molded products may also be prepared using the mixture of ingredients described above and adding a filler to the mixture in order to obtain a homogeneous composition. If desired, the filler may be placed in a solution of the mixture of ingredients or precondensed resin prepared therefrom and a solvent thereafter evaporated to give a filler material coated with the resin. Among such fillers may be mentioned titanium dioxide, various clays, iron oxide, carbon, graphite, asbestos fibers, glass fibers, mica flakes, mica powder, etc. In addition, the compositions herein described may also be employed as sealants for various surfaces including as sealants for cracked glass surfaces, particularly bushings which can be reclaimed which otherwise would have to be discarded. Potting compositions derived from the aforementioned mixture of ingredients can be used for casting purposes wherein various electrical devices, for instance, electrical coils, windings, etc., can be cast within the mixture of ingredients comprising the triallyl cyanurate and the ethoxyline resins and such castings thereafter subjected to elevated temperatures to effect curing of the mixture of ingredients. Castings made from such mixtures of the triallyl cyanurate and the ethoxyline resin have low shrinkage factors and have good electrical properties at elevated temperatures as well as exhibiting the marked improvements in hardness, heat resistance, and strength at the elevated temperatures characteristic of our claimed compositions of matter.

What we claim as new and desire to secure by Letters Patent of the United States is:

1. A composition of matter comprising (1) triallyl cyanurate and (2) a complex epoxide resin comprising a polyether derivative of a polyhydric organic compound containing epoxy groups in which the polyhydric organic compound is selected from the class consisting of polyhydric alcohols and phenols having at least two phenolic hydroxy groups.

2. The heat-treated product of claim 1.

3. A composition of matter comprising (1) triallyl cyanurate and (2) a complex epoxide resin comprising a polyether derivative of a polyhydric organic compound containing epoxy groups in which the polyhydric organic compound is selected from the class consisting of polyhydric alcohols and phenols having at least two phenolic hydroxy groups, and (3) a curing agent for the aforesaid epoxide resin.

4. The heat-treated product of claim 3.

5. A composition of matter comprising (1) triallyl cyanurate, (2) a complex epoxide resin comprising a polyether derivative of a polyhydric organic compound containing epoxy groups in which the polyhydric organic compound is selected from the class consisting of polyhydric alcohols and phenols having at least two phenolic hydroxy groups, and (3) a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidene chloride, dispersed in a liquid plasticizer for the aforesaid vinyl halide resin.

6. The heat-treated product of claim 5.

7. A composition of matter comprising (1) triallyl cyanurate, (2) a complex epoxide resin comprising a polyhydric derivative of a polyhydric organic compound containing epoxy groups in which the polyhydric organic compound is selected from the class consisting of polyhydric alcohols and phenols having at least two phenolic hydroxy groups, (3) a curing agent for the aforesaid epoxide resin and (4) a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidene chloride, dispersed in a liquid plasticizer for the vinyl halide resin.

8. A composition of matter as described in claim 7 in which the curing agent for the epoxy resin is a long-chain normal aliphatic amine containing from 8 to 18 carbon atoms in the aliphatic chain.

9. The heat-treated product of claim 8.

10. A composition of matter comprising (1) triallyl cyanurate, (2) a complex epoxide resin comprising a polyether derivative of a polyhydric organic compound containing epoxy groups in which the polyhydric organic compound is selected from the class consisting of polyhydric alcohols and phenols having at least two phenolic hydroxy groups, and (3) a long-chain normal aliphatic amine containing from 8 to 18 carbon atoms in the aliphatic chain.

11. A composition of matter as described in claim 10 in which the amine is dodecyl amine.

12. A composition of matter comprising (1) triallyl cyanurate and (2) a complex epoxide resin comprising a polyether derivative of a polyhydric alcohol containing epoxy groups obtained by reacting bis-(4-hydroxyphenyl)-2,2-propane and epichlorohydrin.

13. The heat-treated product of claim 12.

14. A composition of matter comprising (1) triallyl cyanurate, (2) a complex epoxide resin comprising a polyether derivative of a polyhydric alcohol containing epoxy groups obtained by reacting bis-(4-hydroxyphenyl)-2,2-propane and epichlorohydrin, and (3) a plastisol comprising a mixture of ingredients containing a finely divided solid copolymer of vinyl chloride and vinylidene chloride dispersed in a liquid plasticizer for the aforesaid vinyl chloride-vinylidene chloride copolymer, the latter copolymer having been obtained by effecting reaction between a mixture of ingredients comprising a predominant amount of vinyl chloride and a minor proportion of vinylidene chloride.

15. The heat-treated product of claim 14.

16. A composition of matter comprising (1) triallyl cyanurate, (2) a complex epoxide resin comprising a polyether derivative of a polyhydric alcohol containing epoxy groups obtained by reacting bis-(4-hydroxyphenyl)-2,2-propane and epichlorohydrin, (3) a plastisol comprising a mixture of ingredients containing a finely divided solid copolymer of vinyl chloride and vinylidene chloride dispersed in a liquid plasticizer for the aforesaid vinyl chloride-vinyldene chloride copolymer, the latter copolymer having been obtained by effecting reaction between a mixture of ingredients comprising a predominant amount of vinyl chloride and a minor proportion of vinylidene chloride, and (4) a curing agent for the aforesaid epoxide resin comprising a long-chain normal aliphatic amine containing from 8 to 18 carbon atoms in the aliphatic chain.

17. The process which comprises (a) forming a mixture of ingredients comprising (1) triallyl cyanurate and (2) a complex epoxide resin comprising a polyether derivative of a polyhydric organic compound containing epoxy groups in which the polyhydric organic compound is selected from the class consisting of polyhydric alcohols and phenols having at least two phenolic hydroxy groups, and (b) heating the aforesaid mixture for a time at a temperature sufficient to effect curing of the aforesaid mixture.

18. The process which comprises (a) forming a mixture of ingredients comprising (1) triallyl cyanurate, (2) a complex epoxide resin comprising a polyether derivative of a polyhydric organic compound containing epoxy groups in which the polyhydric organic compound is selected from the class consisting of polyhydric alcohols and phenols having at least two phenolic hydroxy groups, and (3) a curing agent for the aforesaid epoxide resin, and (b) heating the aforesaid mixture for a time and at a temperature sufficient to effect curing of the aforesaid mixture.

19. The process which comprises (a) forming a mixture of ingredients comprising (1) triallyl cyanurate, (2) a complex epoxide resin comprising a polyether derivative of a polyhydric organic compound containing epoxy groups in which the polyhydric organic compound is selected from the class consisting of polyhydric alcohols and phenols having at least two phenolic hydroxy groups, and (3) a plastisol comprising a mixture of ingredients containing a finely divided vinyl halide resin selected from the class consisting of polyvinyl chloride, copolymers of vinyl chloride and vinyl acetate, and copolymers of vinyl chloride and vinylidene chloride, dispersed in a liquid plasticizer for the aforesaid vinyl halide resin, and (b) heating the aforesaid mixture for a time and at a temperature sufficient to effect curing of the aforesaid mixture.

20. The process which comprises (a) forming a mixture of ingredients comprising (1) triallyl cyanurate, (2) a complex epoxide resin comprsing a polyether derivative of a polyhydric organic compound containing epoxy groups in which the polyhydric organic compound is selected from the class consisting of polyhydric alcohols and phenols having at least two phenolic hydroxy groups, and (3) a plastisol comprising a mixture of ingredients containing a finely divided copolymer of vinyl chloride and vinylidene chloride dispersed in a liquid plasticizer for the aforesaid vinyl chloride-vinylidene chloride copolymer, and (b) heating the aforesaid mixture for a time and at a temperature sufficient to effect curing of the aforesaid mixture.

References Cited in the file of this patent

UNITED STATES PATENTS

| 2,324,483 | Castan | July 20, 1943 |
| 2,510,503 | Kropa | June 6, 1950 |
| 2,557,667 | Kropa | June 19, 1951 |

FOREIGN PATENTS

| 630,647 | Great Britain | Oct. 18, 1949 |